United States Patent
Bera et al.

(10) Patent No.: US 11,607,666 B2
(45) Date of Patent: Mar. 21, 2023

(54) ZINC BASED METAL ORGANIC FRAMEWORKS (ZIT) WITH MIXED LIGANDS FOR HYDROGEN STORAGE

(71) Applicant: Indian Oil Corporation Limited, Mumbai (IN)

(72) Inventors: Tapan Bera, Faridabad (IN); Amardeep Singh, Faridabad (IN); Kaladhar Semwal, Faridabad (IN); Christopher Jayaraj, Faridabad (IN); Umish Srivastava, Faridabad (IN); Alok Sharma, Faridabad (IN); Gurpreet Singh Kapur, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 10 days.

(21) Appl. No.: 17/364,191

(22) Filed: Jun. 30, 2021

(65) Prior Publication Data
US 2022/0001355 A1   Jan. 6, 2022

(30) Foreign Application Priority Data
Jul. 1, 2020   (IN) .............................. 202021027917

(51) Int. Cl.
| | |
|---|---|
| *B01J 20/22* | (2006.01) |
| *B01J 20/28* | (2006.01) |
| *B01J 20/30* | (2006.01) |
| *C01B 3/00* | (2006.01) |
| *C07F 3/06* | (2006.01) |
| *C08G 83/00* | (2006.01) |

(52) U.S. Cl.
CPC ....... *B01J 20/226* (2013.01); *B01J 20/28066* (2013.01); *B01J 20/3085* (2013.01); *C01B 3/0015* (2013.01); *C07F 3/06* (2013.01)

(58) Field of Classification Search
None
See application file for complete search history.

(56) References Cited

U.S. PATENT DOCUMENTS

| | | | |
|---|---|---|---|
| 8,658,562 B2 | 2/2014 | Loiseau et al. | |
| 8,916,722 B2 | 12/2014 | Yaghi et al. | |
| 2006/0252641 A1 | 11/2006 | Yaghi et al. | |
| 2009/0042000 A1 | 2/2009 | Schubert et al. | |
| 2009/0171107 A1 | 7/2009 | Putter et al. | |
| 2009/0185972 A1 | 7/2009 | Lee et al. | |
| 2020/0197901 A1* | 6/2020 | Lu .................... | B01J 20/3085 |

FOREIGN PATENT DOCUMENTS

| | | |
|---|---|---|
| EP | 1070538 B1 | 9/2004 |
| WO | 2010/058123 | 5/2010 |

* cited by examiner

*Primary Examiner* — Daniel Berns
(74) *Attorney, Agent, or Firm* — Workman Nydegger

(57) ABSTRACT

The present invention relates to a synthesis of novel Zn(II)-based Metal Organic Frameworks having mixed organic ligands of 1,3,5-benzene tricarboxylic acid (BTC) and 2-methylimidazole (mIm) through a simple and economic solvothermal method. The synthesized MOFs has cuboids morphology having high surface area (1248 m2/g) capable of hydrogen adsorption at −10° C. to 25° C. temperature and 100 bar pressure. The hydrogen adsorption capabilities of the novel MOFs are in the range of 23-0.2 weight percent.

11 Claims, 7 Drawing Sheets

TGA curve of Zn-MOFs

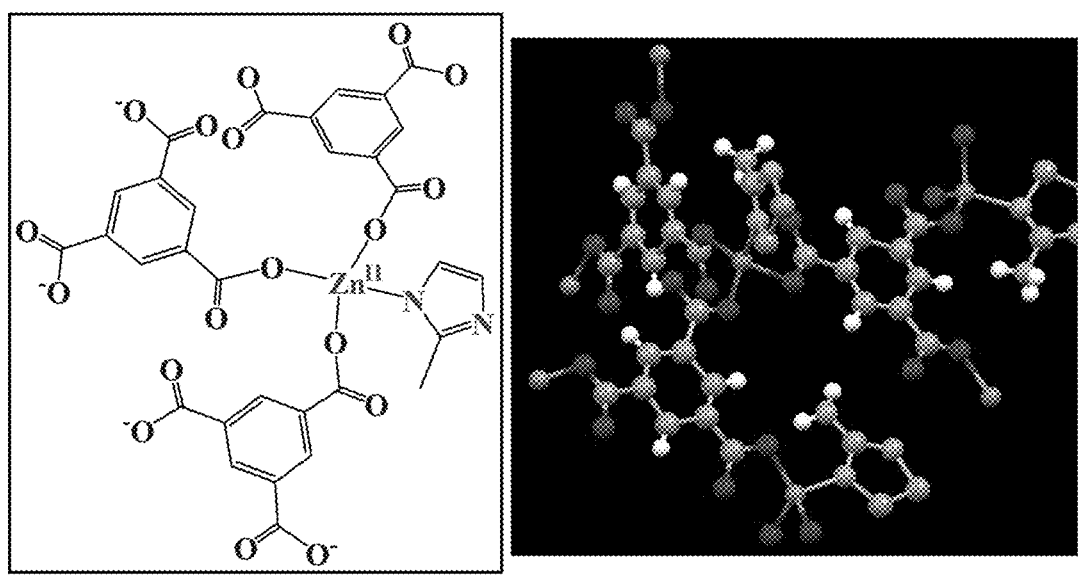
Figure 1: Single-X-ray structure of Zn-MOFs

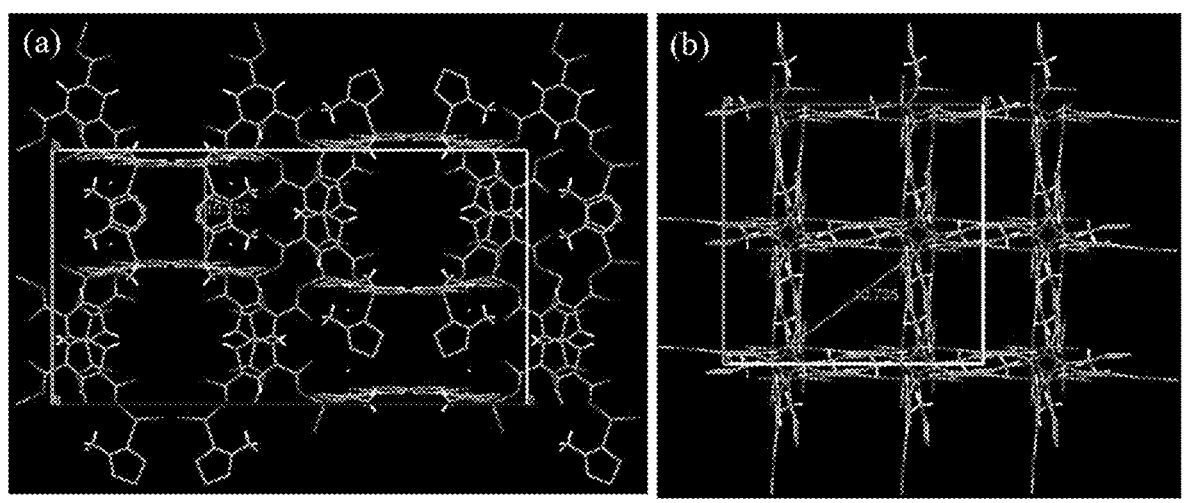
Figure 2: Packing diagram of Zn-MOFs reveals the pore diameter between the cavity

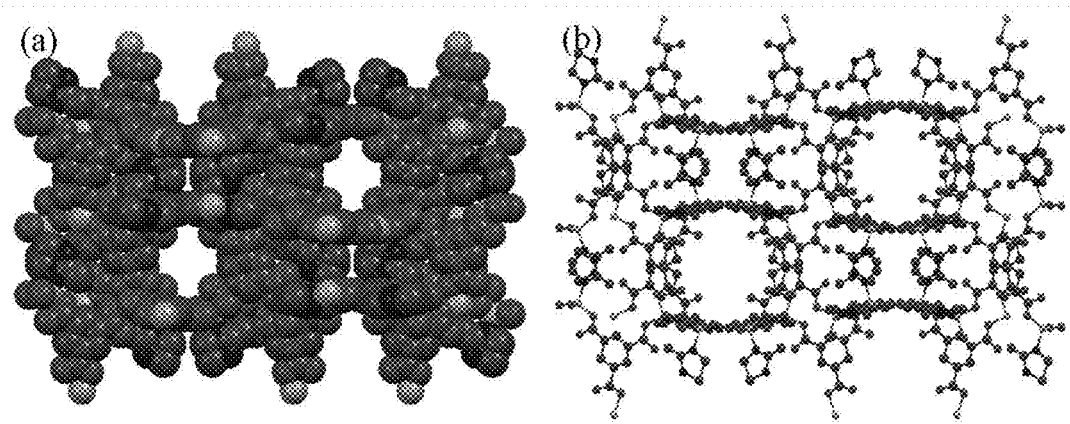
Figure 3: Packing diagram of Zn-MOFs

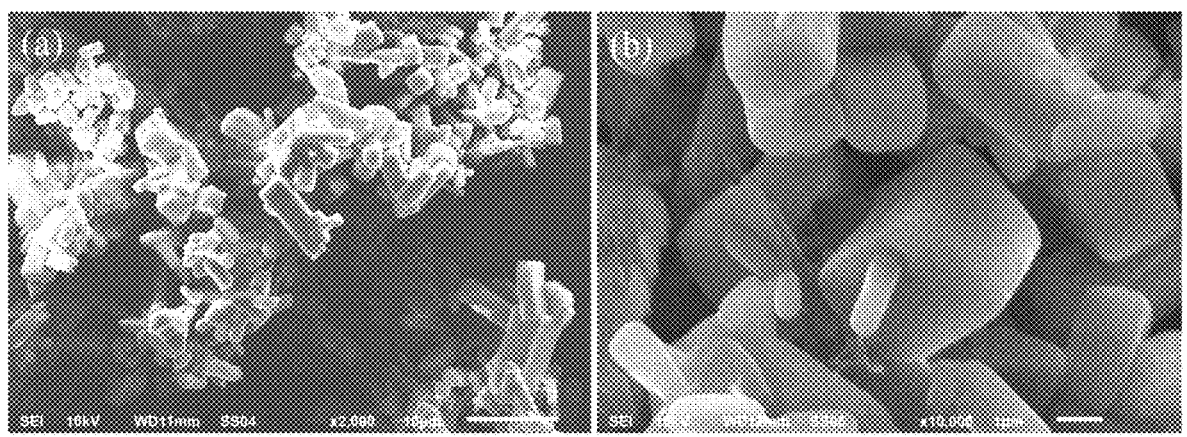
Figure 4: SEM Images of Zn-MOFs

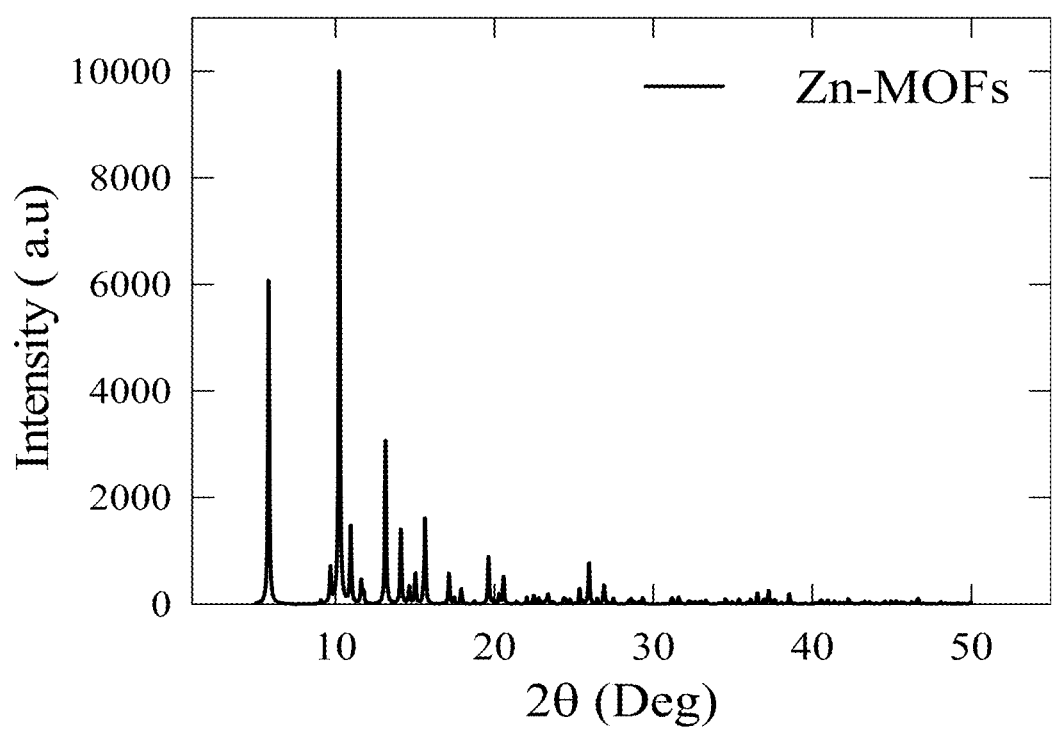
Fig. 5. XRD pattern of Zn-MOFs

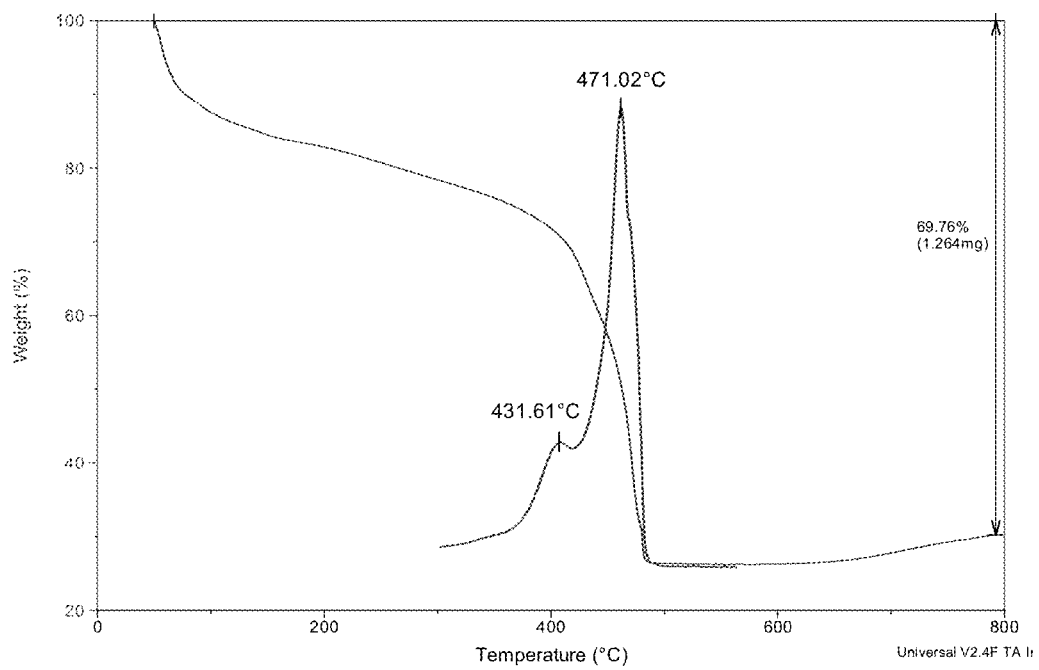
Fig. 6: TGA curve of Zn-MOFs

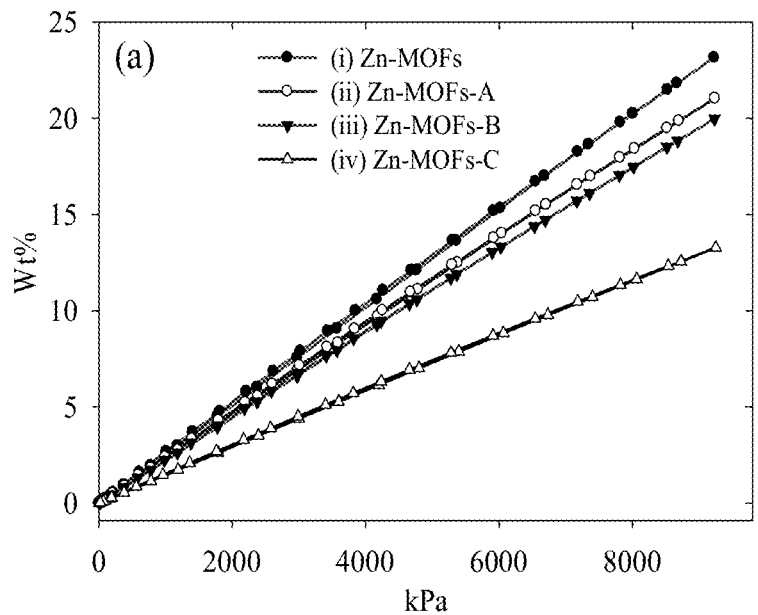
Fig. 7(a): $H_2$ adsorption/desorption isotherms for Zn-MOFs at 0°C
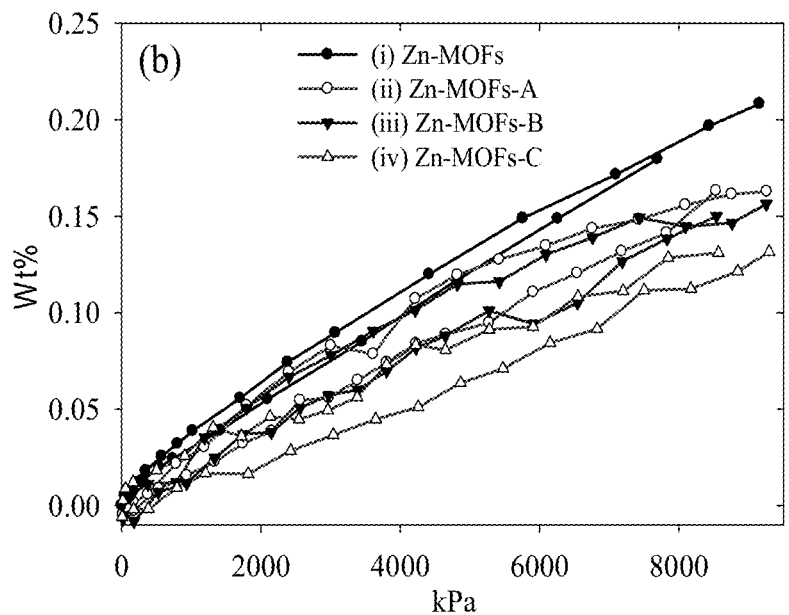
Fig. 7(b): $H_2$ adsorption/desorption isotherms for Zn-MOFs at room temperature (RT)

ZINC BASED METAL ORGANIC FRAMEWORKS (ZIT) WITH MIXED LIGANDS FOR HYDROGEN STORAGE

FIELD OF THE INVENTION

The present invention relates to Zinc based metal organic frameworks (MOFs) and synthesis thereof. Specifically, the present invention relates to the novel Zn(II)-based Metal Organic Frameworks (ZIT) based on mixed organic ligands of 1,3,5-benzene tricarboxylic acid (BTC) and 2-methylimidazole (mIm). Wherein, the said Zn(II)-based Metal Organic Frameworks (ZIT) are synthesized through a simple and economic solvothermal method.

BACKGROUND OF THE INVENTION

Metal Organic Framework(s) (MOFs) is an emerging class of hybrid materials that possess an organic flexible scaffold and topology of traditional materials like zeolites, activated carbonate. The Metal Organic Frameworks (MOFs) mainly composed of metal ions and organic ligands forming one, two or three-dimensional structures. The diversified shape and morphology of Metal Organic Frameworks (MOFs) render a notable impact on their performance and use in many technical fields such as storage, catalysis, and the like.

In the literature various types of MOFs have been reported, such MOFs have different morphologies depending on their synthesis conditions. Also, the choice of metal and organic ligand linkers plays a major role in deciding the properties of MOFs materials.

In recent time, many potential industrial applications of MOFs have been identified and thus it has led to commercial synthesis of such MOFs materials. Thus, there is a need to develop efficient methodologies for the synthesis of MOFs has been a demanding research area which includes mainly thermal, solvothermal or hydrothermal routes. However, solvothermal synthesis of MOFs remains a method of choice due to the high efficiency in single crystal formation. Moreover, scale-up of MOFs preparation is of another commercial importance and the development of efficient and environmentally friendly synthetic method is obvious advantage.

Further, during the last twenty years, a wide range of MOFs and their application have been identified especially in the technical field of hydrogen storage. However, till date none of the identified MOFs have achieved US Department of Energy (US DOE) target for $H_2$ uptake. Further, it is seen from voluminous literature and review articles that most of the MOFs are employed for $H_2$ uptake at liquid nitrogen temperature and high pressures.

US2009/0185972A1 discloses a hydrogen storage system for storing hydrogen gas at elevated pressures and cryogenic temperatures.

WO2010058123 discloses method for hydrothermal preparation of metal-organic framework crystallised porous aluminium carboxylates. EP1070538 discloses metallo-organic polymers for gas separation and purification. Further, scaled-up process for the preparation of MOFs has been disclosed in US20090042000.

In efforts to develop better sorbents for gas adsorption, a few strategies are employed in the synthesis of mixed ligands based MOFs. Further, U.S. Pat. No. 8,916,722 describes complex mixed ligand open framework materials. U.S. Publication No. 2009/0171107 relates to a process for the preparing a porous metal organic framework comprising two organic compounds coordinated to at least one metal ion, where one organic compound is an optional substituted monocyclic, bi-cyclic or polycyclic saturated or unsaturated hydrocarbon and the other organic compound being derived from a di-carboxylic, tri-carboxylic or tetra carboxylic acid.

US2006/0252641A1 discloses a hydrogen storage material containing a MOF that includes a plurality of charged multi-dentate linking ligands and a plurality of metal clusters having at least one open metal site for storing molecular hydrogen.

However, even though a considerable improvement has been made in the state art of MOFs using solvothermal and hydrothermal method but mixed ligands based MOFs and their synthesis method are hardly reported for large scale industrial production.

Further, overall cost is also important for large scale industrial production of such mixed ligands based MOFs materials.

Furthermore, capability of mixed ligands based MOFs materials for efficient $H_2$ storage at $-10°$ C. to $25°$ C. has not been reported so far.

Moreover, thermal stability is also an important factor of such mixed ligands based MOFs materials for efficient $H_2$ storage and there is no such considerable work done on such mixed ligands based MOFs materials which are highly thermal stable.

OBJECTIVE OF THE PRESENT INVENTION

The objective of the present invention is to provide Metal Organic Frameworks (MOFs) for efficient Hydrogen storage at $-10°$ C. to 25 ° C.

The primary objective of the present invention is to provide novel Zinc based Metal Organic Frameworks (Zn—MOFs) having mixed ligands, wherein, the said Zn—MOFs have cuboids morphology, large surface area and high thermal stability.

The main objective of the present invention is to synthesize novel Zinc based Metal Organic Frameworks (Zn—MOFs) having mixed ligands via a solvothermal method.

Another objective of the present invention is to synthesis Zinc based Metal Organic Frameworks (Zn—MOFs) having mixed ligands, wherein, the said Zn—MOFs is capable of maximum $H_2$ storage at $-10°$ C. to $10°$ C.

Another objective of the present invention is to synthesis Zinc based Metal Organic Frameworks (Zn—MOFs) having mixed ligands especially a combination of two distinct kinds of mixed ligands.

SUMMARY OF THE INVENTION:

The state of the art indicates synthesis of MOFs based on single ligand system for efficient $H_2$ storage purpose. However, combination of two distinct kinds of mixed ligands like Trimesic acid (BTC) and 2-methyl Imidazole (mIm) to prepare new MOFs has not been disclosed.

Accordingly, the present invention relates to Zinc based Metal Organic Frameworks (Zn—MOFs) having mixed ligands comprising a combination of 1,3,5-benzene tricarboxylic acid (BTC), and 2-methylimidazole (mIm).

Further, the present invention relates to the synthesis of novel mixed ligands Zn—MOFs having cuboids morphology capable of hydrogen adsorption at $-10°$ C. to $25°$ C. The novel mixed ligands Zn—MOFs of the present invention includes a Zinc ion tetra-coordinated with one ion of 2-methylimidazole, and three ions of 1,3,5-benzene tricarboxylic acid.

Further, the present invention relates to the synthesis of novel mixed ligands Zn—MOFs having high thermal stability (430-470° C.) and large surface area (1248 m2/g).

The novel mixed ligands Zn—MOFs of the present invention are synthesized via a solvothermal method. In a solvothermal method, the metal precursor(s) and organic ligand(s) are heated in an organic solvent for Metal Organic Frameworks (MOFs) crystal formation. Firstly, a Zinc metal precursor solution and an organic ligand solution are prepared by adding at least one Zinc metal precursor and at least one organic ligand in an organic solvent. Then mixing the said Zinc metal precursor solution, the organic ligand solution, and the organic solvent to obtain a reaction mixture. Then heating the said reaction mixture at 100-140° C. for 12-48 hours to obtain precipitates of the Zinc-based Metal Organic Frameworks (MOFs). Then filtering and washing the said precipitates of the Zinc-based Metal Organic Frameworks (MOFs). Purifying the said precipitates of Zinc-based Metal Organic Frameworks (MOFs) and then drying the purified precipitates in an oven at 100° C. for 12-15 hours.

The novel mixed ligands Zn—MOFs of the present invention adsorb hydrogen at −10° C. to 25° C. and capable of maximum $H_2$ storage at −10° C. to 10° C.

DESCRIPTION OF THE DRAWINGS

To further clarify advantages and aspects of the invention, a more particular description of the invention will be rendered by reference to specific embodiments thereof, which is illustrated in the appended drawing(s). It is appreciated that the drawing(s) of the present invention depicts only typical embodiments of the invention and are therefore not to be considered limiting of its scope.

FIG. 1: Depicts single-X-ray structure of Zn—MOFs;

FIG. 2: Depicts packing diagram of Zn—MOFs reveals the pore diameter between the cavity;

FIG. 3: Depicts packing diagram of Zn—MOFs;

FIG. 4: Depicts SEM Images of Zn—MOFs;

FIG. 5: Depicts XRD pattern of Zn—MOFs;

FIG. 6: Depicts TGA curve of Zn—MOFs;

FIG. 7(*a*): Depicts $H_2$ adsorption/desorption isotherms for Zn—MOFs at 0° C.; and FIG. 7(*b*): Depicts $H_2$ adsorption/desorption isotherms for Zn—MOFs at room temperature (RT).

DETAILED DESCRIPTION OF THE INVENTION

For promoting an understanding of the principles of the present disclosure, reference will now be made to the specific embodiments of the present invention further illustrated in the drawings and specific language will be used to describe the same. The foregoing general description and the following detailed description are explanatory of the present disclosure and are not intended to be restrictive thereof. It will nevertheless be understood that no limitation of the scope of the present disclosure is thereby intended, such alterations and further modifications in the illustrated composition, and such further applications of the principles of the present disclosure as illustrated herein being contemplated as would normally occur to one skilled in the art to which the present disclosure relates. Unless otherwise defined, all technical and scientific terms used herein have the same meaning as commonly understood by one of ordinarily skilled in the art to which this present disclosure belongs. The methods, and examples provided herein are illustrative only and not intended to be limiting.

The present invention discloses Zinc-based metal organic frameworks (Zn—MOFs) having mixed ligands selected from a combination of 1,3,5-benzene tricarboxylic acid (BTC), and 2-methylimidazole (mIm). The Zinc-based metal organic frameworks (Zn—MOFs) have a cuboid morphology.

Further, the Zn—MOFs of the present invention is a three dimensional structure comprising of tetrahedral Zn(II) as secondary building units (SBUs) which in turn is constructed by mixed ligands i.e. 2-methylimidazole and 1,3,5-benzene tri-carboxylate ion.

As shown in FIG. 1, the Zn ion units are coordinated by one 2-methylimidazole, and three mono-dentate chelating 1,3,5-benzene tri-carboxyate ions.

The Zinc (Zn) ions are tetra-coordinated, wherein, the $ZnO_3$ unit possesses distorted tetrahedral geometry. The Zinc (Zn) ion as secondary building units (SBUs) are bridged by the fully deprotonated 1,3,5-benzene tricarboxyate anions and 2-methylimidazole to generate a three-dimensional layered arrangement.

Further, in solid state form, the Zinc-based metal organic frameworks (Zn—MOFs) forms square boxes along "ab" plane with average dimension of the boxes are 10.735 Å (FIG. 2). Wherein, each box is prominently available for host molecule. Moreover, the evacuated Zn—MOFs has a theoretical porosity of 15.8% according to PLATON calculations with a probe radius of 10.735 Å (FIG. 3).

Further, the Zinc-based metal organic frameworks of the present invention adsorb hydrogen at −10° C. to 25° C. Specifically, the Zinc-based metal organic frameworks of the present invention adsorb hydrogen at −10° C. to 10° C. The hydrogen adsorption capabilities of the novel Zinc-based metal organic frameworks of the present invention are in the range of 23-0.2 weight percent.

The Table 1 as provided herein below shows the hydrogen adsorption comparative study between literature reported MOFs and the Zinc-based metal organic frameworks (Zn—MOFs) as prepared and disclosed in the present invention. The Zinc-based metal organic frameworks (Zn—MOFs) of the present invention show that the $H_2$ uptake is 23 weight % at 0° C. which is easy to maintain and thus have economical, operational advantages as compared to the literature reported MOFs which have 7.1-7.5 weight % $H_2$ uptake at −196° C. which is difficult to maintain and thus involves higher operational cost.

TABLE 1

| MOF | Metal salt | Organic linker | $H_2$ uptake (material based) |
|---|---|---|---|
| Literature reported MOFs | | | |
| MOF-5 | Zn II | BDC | 7.1 wt % at 77K (−196° C.) |
| MOF-177 | Zn II | BTB | 7.5 wt % at 77K (−196° C.) |
| ZIF-8 | Zn II | mIm | 7.5 wt % at 77K (−196° C.) |
| IOC Synthesized-MOF | | | |
| ZIT | Zn II | BTC and mIm | 23 wt % at 0° C. |

Further, the Zinc-based metal organic frameworks of the present invention have a high thermal stability in a range of 430-470° C.

Furthermore, the Zinc-based metal organic frameworks of the present invention have a large surface area of 1248 m2/g.

Further, various methods have been developed for synthesizing MOFs using metal precursor and corresponding organic ligands. Modifying solvothermal process using these precursors have been employed to form MOFs crystals. solvothermal synthesis is a method where the metal precursor and organic ligand/s are heated in an organic solvent for MOFs crystal formation. In an improved solvothermal synthesis, a solution with MOFs precursors is typically maintained at a predetermined equilibrium temperature for an extended period to induce crystallization.

Moreover, solvothermal methods are typically slow but provide uniform and reproducible materials. Further, number of publications on MOFs synthesis methods by Solvothermal methods is reported in literature like ""Reticular Synthesis and Design of New Materials." Yaghi et al., Nature 423 (2003) 705-714: Solvo-thermal synthesis, structure, and properties of metal organic framework isomers derived from a partially fluorinated link" pachfule et al., 2011: Facile and template-free solvo-thermal synthesis of mesoporous/macroporous metal—organic framework nanosheets" Zhang et al., RSC Adv., 2018,8, 33059-33064.

Accordingly, the novel mixed ligands Zn—MOFs of the present invention are synthesized via a simple and economic solvothermal method. In a solvothermal method, the Zinc (Zn) metal precursor(s) and organic ligand(s) are heated in an organic solvent for Metal Organic Frameworks (MOFs) crystal formation.

According to the main embodiment, the present invention provides method to synthesize novel mixed ligands Zn—MOFs with cuboids morphology having large surface area, high thermal stability.

Firstly, a Zinc metal precursor solution and an organic ligand solution are prepared by adding at least one Zinc metal precursor and at least one organic ligand in an organic solvent. Then mixing the said Zinc metal precursor solution, the organic ligand solution, and the organic solvent to obtain a reaction mixture. Then heating the said reaction mixture at 100-140° C. for 12-48 hours to obtain precipitates of the Zinc-based Metal Organic Frameworks (MOFs). Then filtering and washing the said precipitates of the Zinc-based Metal Organic Frameworks (MOFs). Purifying the said precipitates of Zinc-based Metal Organic Frameworks (MOFs) and then drying the purified precipitates in an oven at 100° C. or 12-15 hours.

The at least one Zinc (Zn) metal precursor is selected from one of Zinc acetate dihydrate, Zinc nitrate hexahydrate, or a combination thereof. The at least one organic ligand is selected from one of a benzene-1,3,5-tricarboxylic acid, N-methyl Imidazole, or a combination thereof. The organic solvent is a combination of Dimethylformamide (DMF), and Ethanol.

The washing of the said precipitates comprises washing with an organic washing agent, washing with distilled water, or a combination. Wherein, the said organic washing agent is selected from Dimethylformamide (DMF), Dichloromethane (DCM), Ethanol, or a mixture thereof.

Further, in the present invention solvent mixture Dimethylformamide (DMF) and Ethanol are used in place of conventional Dimethylformamide (DMF), which dramatically simplify the work-up process with high recovery yield. When the solvent mixture is Dimethylformamide (DMF) and Ethanol then the product yield is 50-70%. However, the product yield is 40-50% when only the Dimethylformamide (DMF) is used as a solvent.

Further, the Scanning Electron Microscope (SEM) images of Zn—MOFs as synthesized by the present solvothermal method are presented in FIG. 4. Wherein, the scanning electron microscopic (SEM) image of Zn—MOFs indicates that the particles are cubical in shape in the range of 0.6-1.2 μm (FIG. 4). Moreover, some cubes have missing corners and instead appear to have perfect cubic, on which a microrod array covers the whole face. Further, FIG. 5 shows the X-ray diffraction pattern of the Zn—MOFs as disclosed and prepared in the present invention. Further, FIG. 6 shows the thermal gravimetric analysis (TGA) curve of the Zn—MOFs as disclosed and prepared in the present invention. Further, FIG. 7(a) shows the H2 adsorption/desorption isotherms for Zn—MOFs at 0° C., and FIG. 7(b) shows the H2 adsorption/desorption isotherms for Zn—MOFs at room temperature (RT), whereas, Zn—MOFs-A (2nd cycle), Zn—MOF-B (3rd cycle) and Zn—MOFs-C (4th cycle).

Solvothermal Synthesis of Zn—MOFs Production
Example—1:

A Zinc (Zn) metal precursor solution is prepared by dissolving 2-5 gm of Zinc acetate dihydrate in 10-30 mL of Dimethylformamide (DMF). Similarly, an organic ligand solution is prepared by dissolving 2-5 gm of benzene-1,3, 5-tricarboxylic acid (BTC) and 0.2-1 gm of 2-methyl Imidazole (mIm) in 10-30 mL of Dimethylformamide (DMF). Thereafter, the obtained Zinc (Zn) metal precursor solution and the said organic ligand solution are sonicated for 10-30min. After that, Zinc (Zn) metal precursor solution is transferred into a round bottom flask and then the organic ligand solution of benzene-1,3,5-tricarboxylic acid (BTC) and 2-methyl Imidazole (mIm) is drop-wise added into it to obtain the reaction mixture. Further, 30-50 mL of Dimethylformamide (DMF) is added into the reaction mixture. The resulting reaction mixture is then allowed to heat at 100-140° C. at 12-48 hours. The obtained reaction precipitates are filtered and washed with Dimethylformamide (DMF) and then washed with Ethanol/H$_2$O mixture. Further, reaction precipitates are kept for solvent exchange by adding Dichloromethane (DCM) in an interval of 12-36 hours followed by solvent decant. This procedure is continued three times over a week to remove excess of Dimethylformamide (DMF) solvent. Finally, the reaction precipitates are overnight dried in an oven at 100° C.

Technical Advantages of the Invention:

The present invention provides many advantages over the state of the art. The Zn—MOFs as prepared in the present invention requires low-cost materials, thus feasibility of large-scale industrial production of Zn—MOFs is made possible. Further, the Zn—MOFs as prepared in the present invention are highly thermal stable i.e., thermal stability in the range of 430-470 m2/g. Furthermore, the Zn—MOFs as prepared in the present invention are more efficient for H$_2$ uptake capacity at −10° C. to 10° C. when compared to other state of the art MOFs which show storage at cryogenic temperature. As the temperature range −10° C. to 10° C. is close to room temperature and therefore this temperature range is affordable to maintain when compared to the cryogenic temperature.

What is claimed is:

1. Zinc-based metal organic frameworks comprising:
   mixed ligands, wherein the mixed ligands comprise 1,3, 5-benzene tricarboxylic acid (BTC), and 2-methyl imidazole (mIm), and wherein the zinc-based metal organic frameworks have a cuboid morphology.

2. The Zinc-based metal organic frameworks as claimed in claim 1, wherein a zinc ion is tetra-coordinated with one ion of 2-methylimidazole, and three ions of 1,3,5-benzene tricarboxylic acid.

3. The Zinc-based metal organic frameworks as claimed in claim 1, wherein the zinc-based metal organic frameworks adsorb hydrogen at −10° C. to 25° C.

4. The Zinc-based metal organic frameworks as claimed in claim 3, wherein the zinc-based metal organic frameworks adsorb hydrogen at −10° C. to 10° C.

5. The Zinc-based metal organic frameworks as claimed in claim 1, wherein the zinc-based metal organic frameworks have high thermal stability in a range of 430-470° C.

6. The zinc-based metal organic frameworks as claimed in claim 1, wherein the zinc-based metal organic frameworks have a large surface area of 1248 $m^2/g$.

7. A process for synthesizing zinc-based metal organic frameworks, the process comprising:
preparing a zinc metal precursor solution by adding at least one zinc metal precursor in an organic solvent;
preparing an organic ligand solution by adding 1,3,5 benezene-tricarboxylic acid (BTC) and 2-methyl Imidazole (mIm) in the organic solvent;
mixing the zinc metal precursor solution, the organic ligand solution and the organic solvent; to obtain a reaction mixture;
heating the reaction mixture at a temperature in a range of 100-140° C. for 12-48 hours to obtain precipitates of the zinc-based metal organic frameworks;
filtering, washing the precipitates of the zinc-based metal organic frameworks;
purifying the precipitates of zinc-based metal organic frameworks; and
drying the purified precipitates of the zinc-based metal organic frameworks in an oven at a temperature in a range of 100° C. for 12-15 hours.
wherein the zinc-based metal organic frameworks have a cuboid morphology.

8. The process as claimed in claim 7, wherein the at least one zinc metal precursor is selected from one of zinc acetate dihydrate, zinc nitrate hexahydrate, or a combination thereof.

9. The process as claimed in claim 7, wherein the organic solvent is a combination of dimethylformamide (DMF) and ethanol.

10. The process as claimed in claim 7, wherein washing of the precipitates comprises washing with an organic washing agent, washing with distilled water, or a combination.

11. The process as claimed in claim 10, wherein the organic washing agent is selected from Dimethylformamide (DMF), dichloromethane (DCM), ethanol, or a mixture thereof.

* * * * *